US007525613B2

(12) United States Patent
Teranishi

(10) Patent No.: US 7,525,613 B2
(45) Date of Patent: Apr. 28, 2009

(54) LIQUID CRYSTAL DISPLAY DEVICE AND DISPLAY CONTROL METHOD THEREOF

(75) Inventor: Kentaro Teranishi, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 394 days.

(21) Appl. No.: 11/423,545

(22) Filed: Jun. 12, 2006

(65) Prior Publication Data

US 2006/0284817 A1 Dec. 21, 2006

(30) Foreign Application Priority Data

Jun. 15, 2005 (JP) ............................ 2005-175232

(51) Int. Cl.
*G02F 1/1335* (2006.01)

(52) U.S. Cl. .......................... 349/100; 349/98; 349/204

(58) Field of Classification Search ................. 345/204, 345/94, 581; 349/98, 78, 100, 102, 204, 349/94, 581
See application file for complete search history.

(56) References Cited

U.S. PATENT DOCUMENTS 6,353,435 B2 * 3/2002 Kudo et al. ................. 345/204
6,862,021 B2 * 3/2005 Kudo et al. ................. 345/204
7,034,790 B2 * 4/2006 Fukami et al. ................ 345/94
2001/0028346 A1 * 10/2001 Kudo et al. ................. 345/204
2002/0130881 A1 * 9/2002 Kudo et al. ................. 345/581

FOREIGN PATENT DOCUMENTS

| | | |
|---|---|---|
| JP | 2002-202491 | 7/2002 |
| JP | 3770360 | 2/2006 |
| KR | 1999-0077930 | 10/1999 |

* cited by examiner

*Primary Examiner*—Ellen Kim
(74) *Attorney, Agent, or Firm*—Oblon, Spivak, McClelland, Maier & Neustadt, P.C.

(57) ABSTRACT

A liquid crystal display device comprises a liquid crystal display panel including a plurality of pixels are arrayed substantially in a matrix, and a display control circuit which sequentially selects the rows of pixels in synchronism with a horizontal period of a sync signal externally supplied together with a video signal, and drives the pixels of a selected row in accordance with pixel data items obtained from the video signal for each horizontal period. The display control circuit includes a clock generator which generates a reference clock signal of a constant frequency, a period detector which detects a length of the horizontal period as the number of pulses of the reference clock signal, and a drive timing generator which adjusts a row selection period based on the number of pulses detected by the period detector.

6 Claims, 5 Drawing Sheets

LIQUID CRYSTAL DISPLAY DEVICE AND DISPLAY CONTROL METHOD THEREOF

CROSS-REFERENCE TO RELATED APPLICATIONS

This application is based upon and claims the benefit of priority from prior Japanese Patent Application No. 2005-175232, filed Jun. 15, 2005, the entire contents of which are incorporated herein by reference.

BACKGROUND OF THE INVENTION

1. Field of the Invention

The present invention relates to a liquid crystal display device applied to a liquid crystal display panel of, for example, optically compensated bend (OCB) mode, and a display control method thereof.

2. Description of the Related Art

A flat-panel display device represented by a liquid crystal display device is widely utilized as display device for a computer, a car navigation system, a television receiver, etc.

In general, the liquid crystal display device comprises a liquid crystal display panel that includes a matrix array of liquid crystal pixels, and a display control circuit that controls the display panel. The liquid crystal display panel has a structure in which a liquid crystal layer is held between an array substrate and an counter substrate.

The array substrate includes a plurality of pixel electrodes arrayed substantially in a matrix, a plurality of gate lines arranged along the rows of pixel electrodes, a plurality of source lines arranged along the columns of pixel electrodes, and a plurality of switching elements arranged near intersections between the gate lines and the source lines. Each switching element is made, for example, of a thin film transistor (TFT), and is turned on to apply the potential of a corresponding source line to a corresponding pixel electrode when a corresponding gate line has been driven. On the counter substrate, a common electrode is provided to face the pixel electrodes arrayed on the array substrate. Each pair of the pixel electrodes and common electrode serves as a pixel together with a pixel region of the liquid crystal layer, and controls the arrangement of liquid crystal molecules in the pixel region by an electric field between the pixel electrode and the common electrode. The display control circuit includes a gate driver for driving the gate lines, a source driver for driving the source lines, and a controller for controlling operation timings of the gate driver and source driver.

In the case where the liquid crystal display device is used for a television receiver that principally displays a moving image, a liquid crystal display panel of an OCB mode, in which liquid crystal molecules exhibit a good response characteristic, has begun to be employed (refer to Jpn. Pat. Appln. KOKAI Publication No. 2002-202491). In this liquid crystal display panel, liquid crystal molecules are set to in a splay alignment before supply of power by alignment layers which have been rubbed parallel to each other on the pixel electrode and the common electrode. The liquid crystal display panel begins a display operation after the liquid crystal molecules have been transferred from the splay alignment to a bend alignment by a relatively strong electric field applied in an initialization process which is performed upon supply of power.

A reason why the liquid crystal molecules get in the splay alignment before supply of power is that the splay alignment is more stable than the bend alignment in terms of energy in a no-voltage-applied state of a liquid crystal drive voltage. Even after the liquid crystal molecules have been transferred to the bend alignment, the bend alignment of the molecules tends to be inverse-transferred to the splay alignment if a no-voltage-applied state or a voltage-applied state of a voltage not higher than a level at which the energy of splay alignment is balanced with the energy of bend alignment, continues for a long time. The viewing angle characteristic of the splay alignment significantly differs from that of the bend alignment. Thus, a normal display is not attained in the splay alignment.

In a conventional driving method that prevents the inverse-transfer from the bend alignment to the splay alignment, a high voltage is applied to liquid crystal molecules in a part of one frame period for display of single-frame image, for example. This high voltage is equivalent to a pixel voltage for a black display in a liquid crystal display panel, which is a normally-white type, so this driving method is called "black insertion driving."

In recent years, liquid crystal display panels have become of higher resolution and larger size. In this case, an increase in the operation frequencies of the gate driver and the source driver is required to drive all the pixels for each frame period. In general, the gate driver and the source driver drive the gate lines and the source lines, respectively, in synchronism with a sync signal and a clock signal which are supplied together with a video signal from an external signal source such as a DVD or a VTR. However, since a horizontal period of the sync signal fluctuates depending on a reproduction process for the video signal, undesirable change in pixel charging time occurs according to a phase difference of the clock signal to the horizontal period of the sync signal. This raises a problem that the quality of displayed images deteriorates due to insufficiently charged pixels.

BRIEF SUMMARY OF THE INVENTION

An object of the present invention is to provide a liquid crystal display device which can prevent pixels from being insufficiently charged due to the fluctuation of the horizontal period of a sync signal externally supplied together with a video signal, and a display control method thereof.

According to a first aspect of the present invention, there is provided a liquid crystal display device comprising: a liquid crystal display panel including a plurality of pixels arrayed substantially in a matrix; and a display control circuit which sequentially selects the rows of pixels in synchronism with a horizontal period of a sync signal externally supplied together with a video signal, and drives the pixels of a selected row in accordance with pixel data obtained from the video signal for each horizontal period, wherein the display control circuit includes a clock generator which generates a reference clock signal of a constant frequency; a period detector which detects a length of the horizontal period as the number of pulses of the reference clock signal; and a drive time adjusting section which adjusts a row selection period based on the number of pulses detected by the period detector.

According to a second aspect of the present invention, there is provided a display control method of a liquid crystal display device which comprises a liquid crystal display panel including a plurality of pixels arrayed substantially in a matrix, and a display control circuit which sequentially selects the rows of pixels in synchronism with a horizontal period of a sync signal externally supplied together with a video signal, and drives the pixels of a selected row in accordance with pixel data obtained from the video signal for each horizontal period, the method comprising: generating a reference clock signal of a constant frequency; detecting a length of the horizontal period as the number of pulses of the reference clock signal; and adjusting a row selection period based on the detected number of pulses.

According to the liquid crystal display device and display control method, the length of the horizontal period is detected as the number of pulses of the reference clock signal, and the row selection period is adjusted based on the detected number of pulses obtained. Consequently, the pixels of each row are driven without occurrence of insufficient charging caused by fluctuation of the horizontal period of the sync signal. Accordingly, it is possible to prevent the quality of displayed images from deteriorating due to insufficiently charged pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to one embodiment of the present invention will be described in more details with reference to the accompanying drawings.

Figure 1:
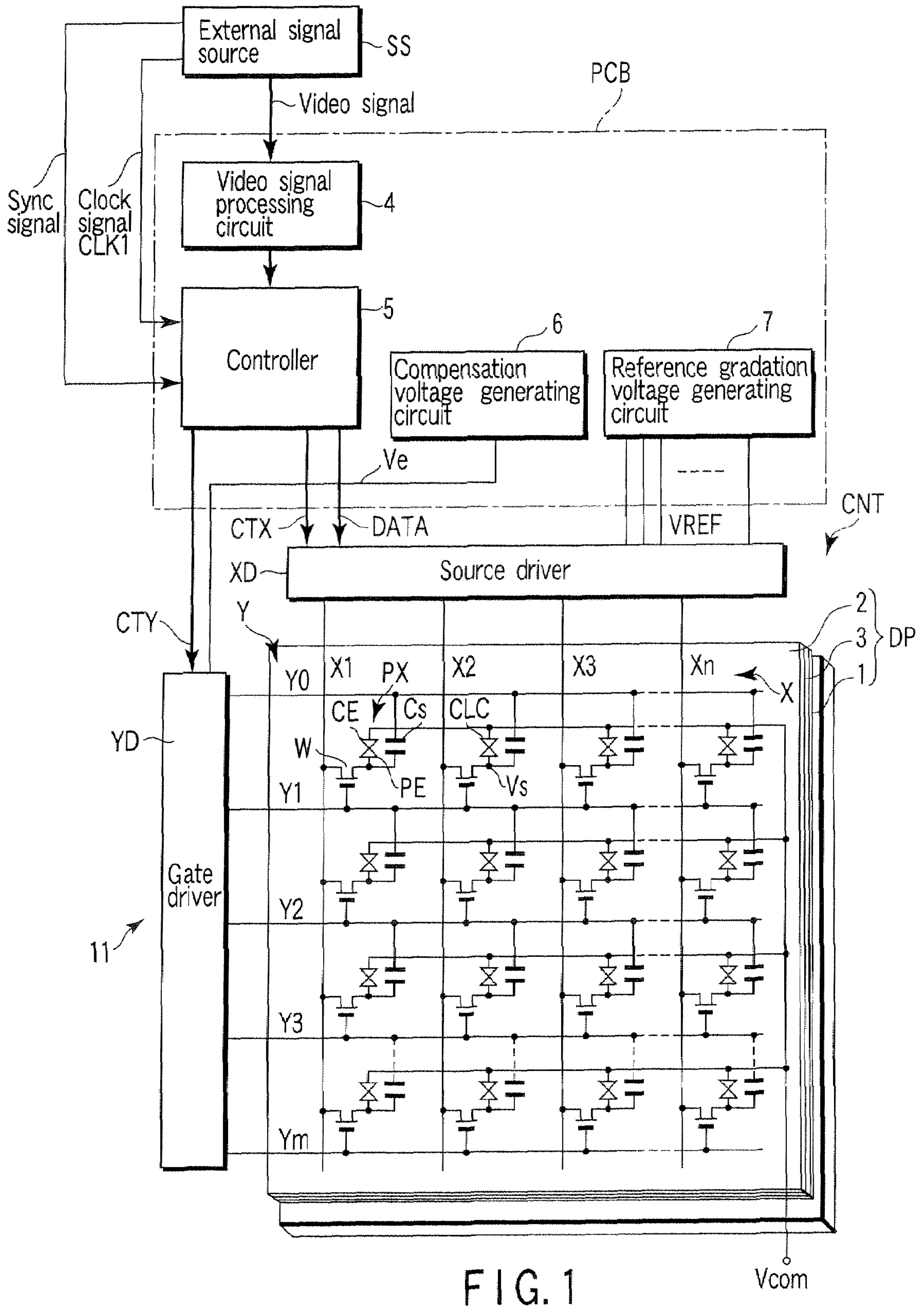
FIG. 1 is a diagram schematically showing the circuit configuration of a liquid crystal display device according to one embodiment of the present invention.

FIG. 1 schematically shows the circuit configuration of the liquid crystal display device 11 according to the embodiment. The liquid crystal display device 11 comprises an OCB-mode liquid crystal display panel DP, and a display control circuit CNT connected to the liquid crystal display panel DP. The liquid crystal display panel DP has a structure in which a liquid crystal layer 3 is held between an array substrate 1 and a counter substrate 2 which serve as a pair of electrode substrates. The liquid crystal layer 3 includes an OCB liquid crystal material whose liquid crystal molecules are transferred in advance from a splay alignment to a bend alignment to attain a normally-white display operation in an OCB mode and are prevented from being inverse-transferred from the bend alignment to the splay alignment by a black display voltage periodically applied thereto. The display control circuit CNT applies a liquid crystal drive voltage from the array substrate 1 and counter substrate 2 to the liquid crystal layer 3 to control transmittance of the liquid crystal display panel DP. The splay alignment can be transferred to the bend alignment by applying a relatively large electric field to the liquid crystal molecules in a predetermined initialization process which is performed by the display control circuit CNT upon supply of power.

The array substrate 1 includes a plurality of pixel electrodes PE arrayed substantially in a matrix on a transparent insulating substrate such as a glass plate, a plurality of gate lines Y (Y0 to Ym) arranged along the rows of pixel electrodes PE, a plurality of source lines X (X1 to Xn) arranged along the columns of pixel electrodes PE, and a plurality of pixel switching elements W arranged near intersections between the gate lines Y and the source lines X. Each of the pixel switching elements turns on between a corresponding source line X and a corresponding pixel electrode PE when a corresponding gate line is driven. Further, each pixel switching element W is made, for example, of a thin-film transistor, a gate of the thin-film transistor is connected to the gate line Y, and a source-drain path is connected between the source line X and the pixel electrode PE.

The counter substrate 2 includes a color filter arranged on a transparent insulating substrate such as a glass plate, and a common electrode CE formed on the color filter and facing the pixel electrodes PE. The pixel electrodes PE and the common electrode CE are made of a transparent electrode material such as ITO, and are covered with alignment layers rubbed parallel to each other. Each pair of the pixel electrode PE and the common electrode CE serves as a pixel PX together with a pixel region of the liquid crystal layer 3, in which the alignment of liquid crystal molecules is controlled by an electric field between the pixel electrode PE and the common electrode CE.

The pixels PX have liquid crystal capacitances CLC provided between the pixel electrodes PX and the common electrode CE and connected to one ends of storage capacitances Cs. Each of the storage capacitances Cs is obtained by capacitive coupling between the pixel electrode PE of one pixel PX and a gate line Y which is located next to this pixel PX on one side and controls the pixel switching elements W for the pixels PX of a previous row, and has a sufficiently large capacitance with respect to the parasitic capacitance of the pixel switching element W. In addition, although there are dummy pixels located outside the matrix array of the pixels PX which serve as a display area, these dummy pixels are omitted in FIG. 1. The dummy pixels are wired in the same manner as that for the pixels PX in the display area in order to establish equivalent conditions with respect to the parasitic capacitance or the like. A gate line Y0 is provided for such dummy pixels.

The display control circuit CNT includes a video signal processing circuit 4, a gate driver YD, a source driver XD, and a controller 5. The video signal processing circuit receives a video signal including pixel data items DATA for the pixels PX and input from an external signal source SS every one-frame period (vertical scan period) and processes the video signal to convert resolution, gradation and the like. The gate driver YD sequentially drives the gate lines Y0 to Ym to turn on the switching elements W in units of one row. The source driver XD converts the pixel data items DATA which are supplied in series for the pixels PX of each row as a conversion result of the video signal processing circuit 4 to pixel voltages Vs and outputs the pixel voltages Vs to the source lines X1 to Xn while the switching elements W of each row are kept conductive by driving a corresponding gate line Y. The controller 5 controls operation timings or the like of the gate driver YD and the source driver XD to be suitable for the pixel data items DATA for the pixels PX of each row. Each pixel voltage Vs is a voltage applied to a corresponding pixel electrode PE with a common voltage Vcom of the common electrode CE used as a reference. The polarity of the pixel voltage Vs is inverted with respect to the common voltage Vcom so as to carry out frame inversion driving and line inversion driving, for example.

Each of the gate driver YD and the source driver XD is provided as integrated circuit (IC) chips mounted on flexible wiring sheets arranged along an outer edge of the array substrate 1, for example. On the other hand, the video signal processing circuit 4 and the controller 5 are provided on an external printed circuit board PCB. The controller 5 produces a gate driver control signal CTY for a control of sequentially driving the gate liens Y, and a source driver control signal CTX for a control of assigning the pixel data items DATA for the pixels PX of each row to the source lines X and specifying an output polarity, for example. The control signal CTY is supplied from the controller 5 to the gate driver YD, and the control signal CTX is supplied from the controller 5 to the source driver XD together with the pixel data items DATA for the pixels PX of each row which are obtained as the conversion result from the video signal processing circuit 4.

The display control circuit CNT further includes a compensation voltage generating circuit 6 and a gradation reference voltage generating circuit 7. The compensation voltage generating circuit 6 generates a compensation voltage Ve to be used to compensate for fluctuation of the pixel voltages Vs caused by the pixel switching elements W for the pixels PX of one row. The gradation reference voltage generating circuit 7 generates a predetermined number of gradation reference voltages VREF to be used to convert the pixel data items DATA into the pixel voltage Vs. When the pixel switching elements W for the pixels PX of the row are made nonconductive, the compensation voltage Ve is applied via the gate driver YD to a previous gate line Y which is located on one side next to the gate line Y connected to the pixel switching elements W.

The gate driver YD is controlled by the control signal CTY to sequentially select the gate lines Y1 to Ym in one frame period and supply to a selected one of the gate lines Y1 to Ym an on-voltage by which the pixel switching elements W for the pixels PX of one row are made conductive for one horizontal period. The video signal processing circuit 4 outputs a conversion result of pixel data items DATA for the pixels PX of one row every one horizontal period. The source driver XD converts the pixel data items DATA to pixel voltages Vs, respectively, by referring to the predetermined number of gradation reference voltages VREF supplied from the gradation reference voltage generating circuit 7 described above, and outputs the pixel voltages Vs to the source lines X1 to Xn in parallel.

For example, when the gate line Y1 is driven by the on-voltage from the gate driver YD to turn on all the pixel switching elements W connected to the gate line Y1, the pixel voltages Vs on the source lines X1 to Xn are supplied to the corresponding pixel electrodes PE and the ends of the storage capacitances Cs via the pixel switching elements W, respectively. The compensation voltage Ve from the compensation voltage generating circuit 6 is output to the previous gate line Y0 next to the gate line Y1 by the gate driver YD. Immediately after all the pixel switching elements W connected to the gate line Y1 are kept conductive for one horizontal period, the gate driver YD outputs an off-voltage to the gate line Y1 to make the pixel switching elements W nonconductive. When these pixel switching elements W have been made nonconductive, the compensation voltage Ve serves to reduce the amount of charge pulled out from the pixel electrodes PE by the parasitic capacitances of the pixel switching elements W and cancel substantial fluctuation of the pixel voltage Vs, i.e., a field-through voltage $\Delta Vp$.

Figure 2:
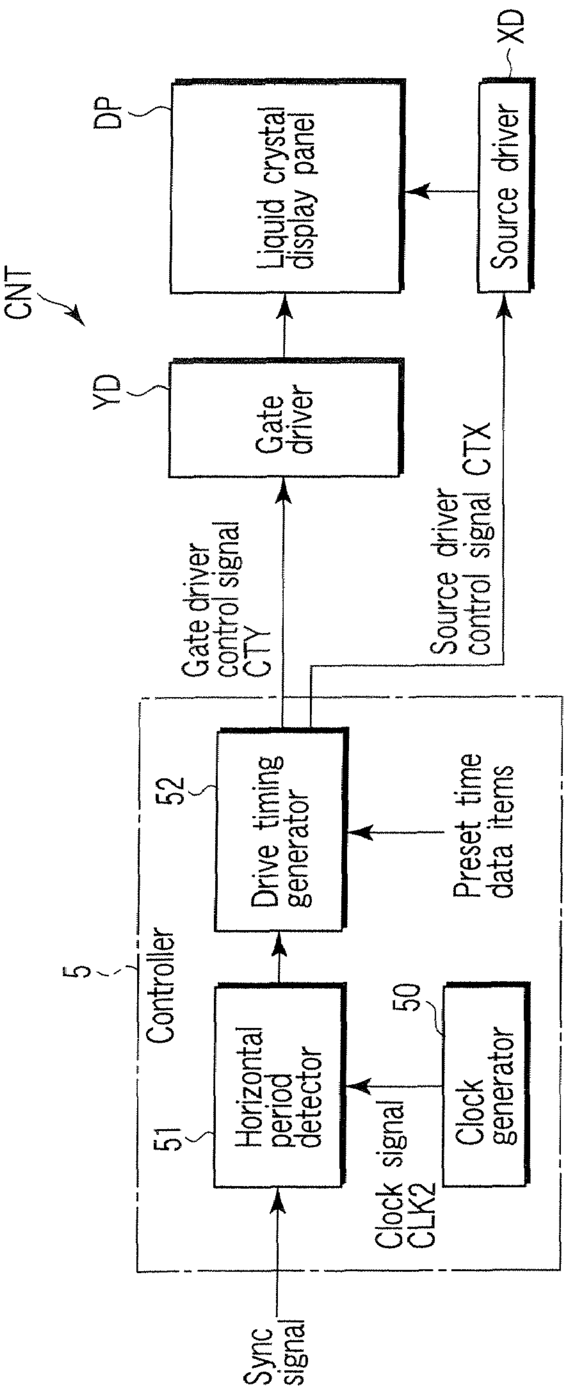
FIG. 2 is a block diagram showing an example of the configuration of a controller shown in FIG. 1.

FIG. 2 shows an example of the configuration of the controller 5 of the liquid crystal display device 11.

The controller 5 is associated with the gate driver YD so as to sequentially select the rows of pixels PX in synchronism with a horizontal period of a sync signal which is externally supplied together with the video signal. The controller 5 is also associated with the source driver XD so as to drive the pixels PX of a selected row in accordance with the pixel data items DATA obtained from the video signal per one horizontal period. As shown in FIG. 2, the controller 5 has a clock generator 50, a horizontal period detector 51, and a drive timing generator 52. The clock generator 50 generates a clock signal CLK2 of a constant frequency as a reference clock signal. The horizontal period detector 51 detects a start timing of the horizontal period of the sync signal supplied from an external signal source SS, and also detects a length of the horizontal period as the number of pulses of the clock signal CLK2. The drive timing generator 52 adjusts a row selection period based on the number of pulses of the clock signal CLK2. The row selection period is an on-period during which the pixel transistors W are kept conductive to apply the pixel voltages Vs to the pixels PX, and must be suitable for the optical characteristic of the liquid crystal display panel DP.

For the adjustment of the row selection period, plurality of preset time data items are held in the drive timing generator 52 by use of a logic circuit, a register or the like. The preset time data items represent a first offset between a timing of starting selection for the pixels PX of one row in synchronism with the start timing of the horizontal period and a timing of starting drive of the pixels PX of the selected row, and a second offset between a timing of terminating selection for the pixels PX of the row and a timing of terminating drive of the pixels of the selected row, by the number of pulses of the reference clock signal. More specifically, the first offset corresponds to a period between a timing at which the gate driver YD starts driving of, for example, the gate line Y1 and a timing at which the source driver XD starts driving of all the source lines X1 to Xn. The second offset corresponds to a period between a timing at which the gate driver YD terminates driving of the gate line Y1 and a timing at which the source driver XD terminates driving of all the source lines X1 to Xn.

Thus, the drive timing generator 52 generates the gate driver control signal CTY and source driver control signal CTX such that the row selection period is adjusted to cope with fluctuation of the horizontal period detected as the number of pulses of the clock signal CLK2.

Figure 3:
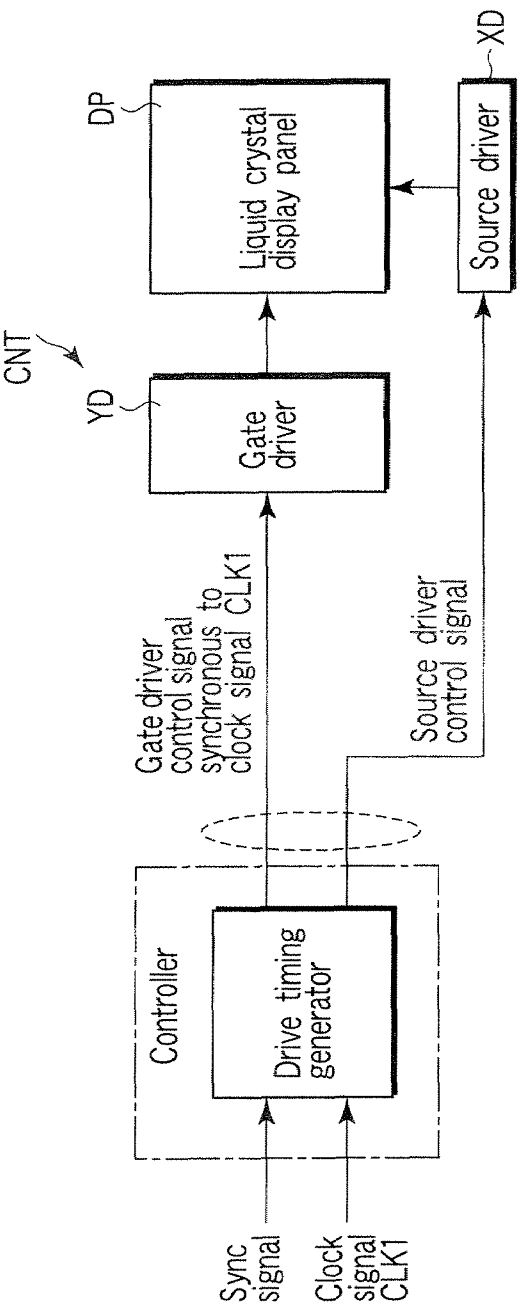
FIG. 3 is a block diagram showing a comparative example to the controller shown in FIG. 2.

Herein, as a comparative example, a conventional controller will be explained. In this controller, the drive timing generator shown in FIG. 3 is provided. This drive timing generator generate a gate driver control signal and a source driver control signal such that the row selection period is preset by the number of pulses of a clock signal CLK1 supplied together with the sync signal from the external signal source SS, irrespective of fluctuation of the horizontal period.

Figure 4:
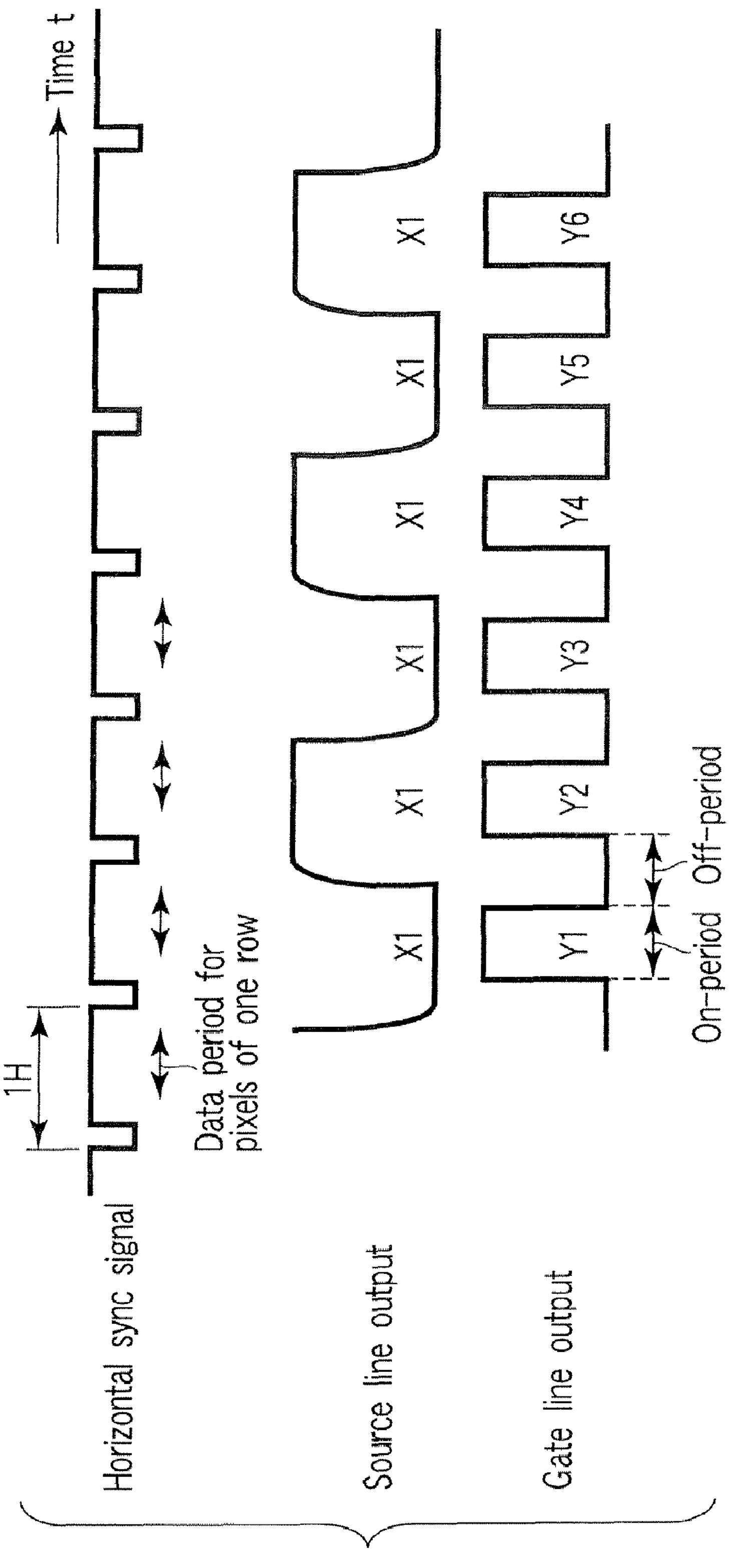
FIG. 4 shows an operation obtained in the comparative example shown in FIG. 3.

When the horizontal period of the sync signal becomes shorter than the length shown in FIG. 4 owing to the external signal source SS, the potential of the source line X1 starts changing before the potential of the gate line Y1 falls upon termination of the on-period. As a result, a desired pixel voltage Vs would not be held in the pixel PX. That is, it becomes difficult to attain sufficient charging time to charge the pixel PX to a pixel voltage Vs suitable for optical characteristic of the liquid crystal display panel DP.

Accordingly, the quality of displayed images deteriorates due to insufficiently charged pixels.

For this reason, in the controller shown in FIG. 2, time management is performed in which the row selection time is adjusted by use of the above-described first and second offsets shown by the number of pulses of the clock signal CLK2 of a constant frequency generated by the clock generator 50.

Next, the operation of the liquid crystal display device 11 will be described.

Figure 5:
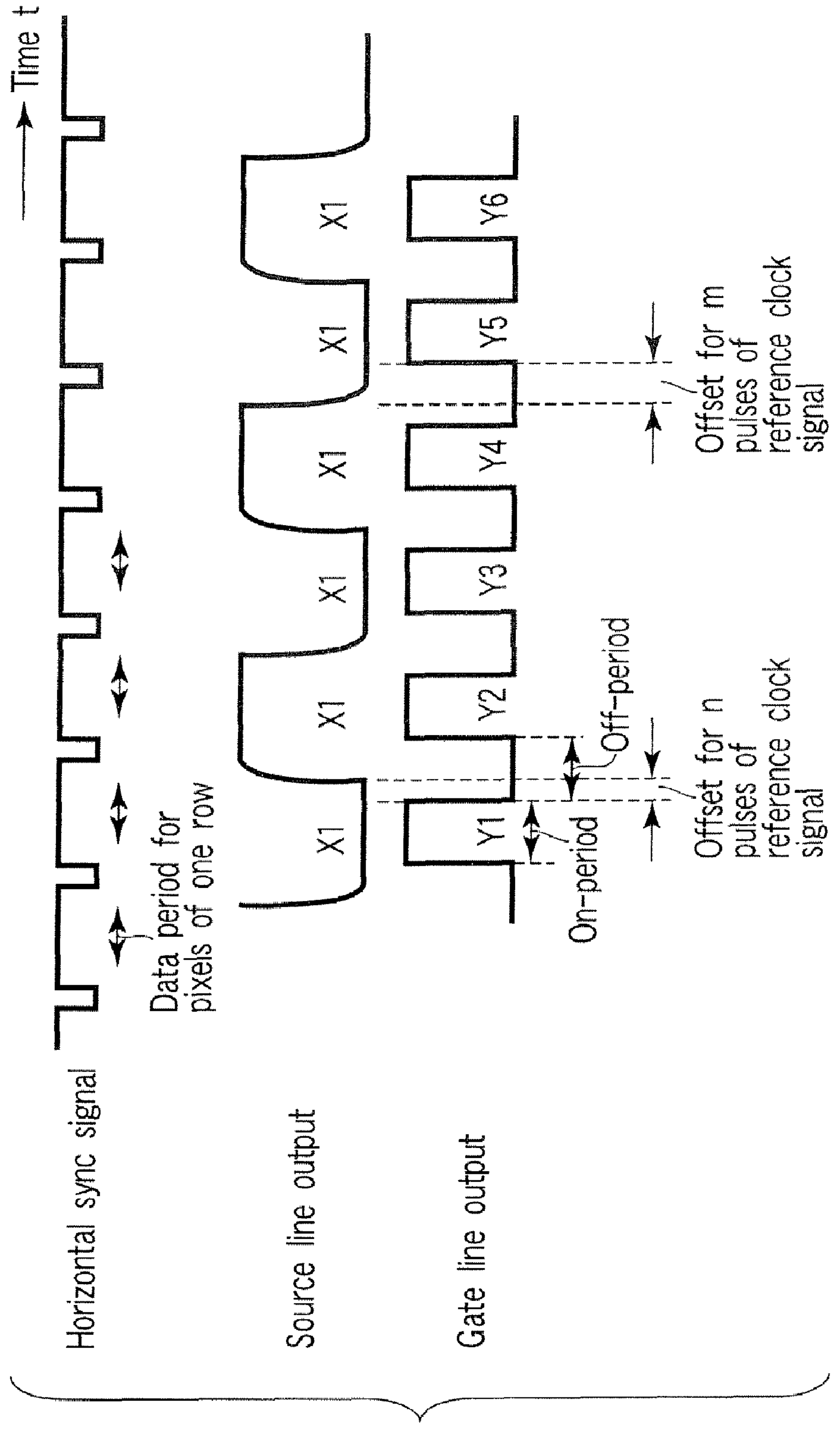
FIG. 5 shows an operation in the case where a horizontal period becomes short in the configuration shown in FIG. 2.

Even when one horizontal period of the sync signal is shortened as shown in FIG. 5, the horizontal period detector 51 detects the length of the horizontal period of the sync signal as the number of pulses of the clock signal CLK2, and the drive timing generator 52 outputs the gate driver control signal CTY and source driver control signal CTX such that the row selection period is adjusted to a length obtained by excluding the numbers of pulses for the first and second offsets from the number of pulses for the horizontal period.

Namely, the row selection period (on-period) is adjusted to be sufficiently long according to the length of the horizontal period.

In FIG. 5, the second offset is set to n pulses of the clock signal CLK2 (reference clock signal), and the first offset is set to m pulses of the clock signal CLK2.

Figure 6:
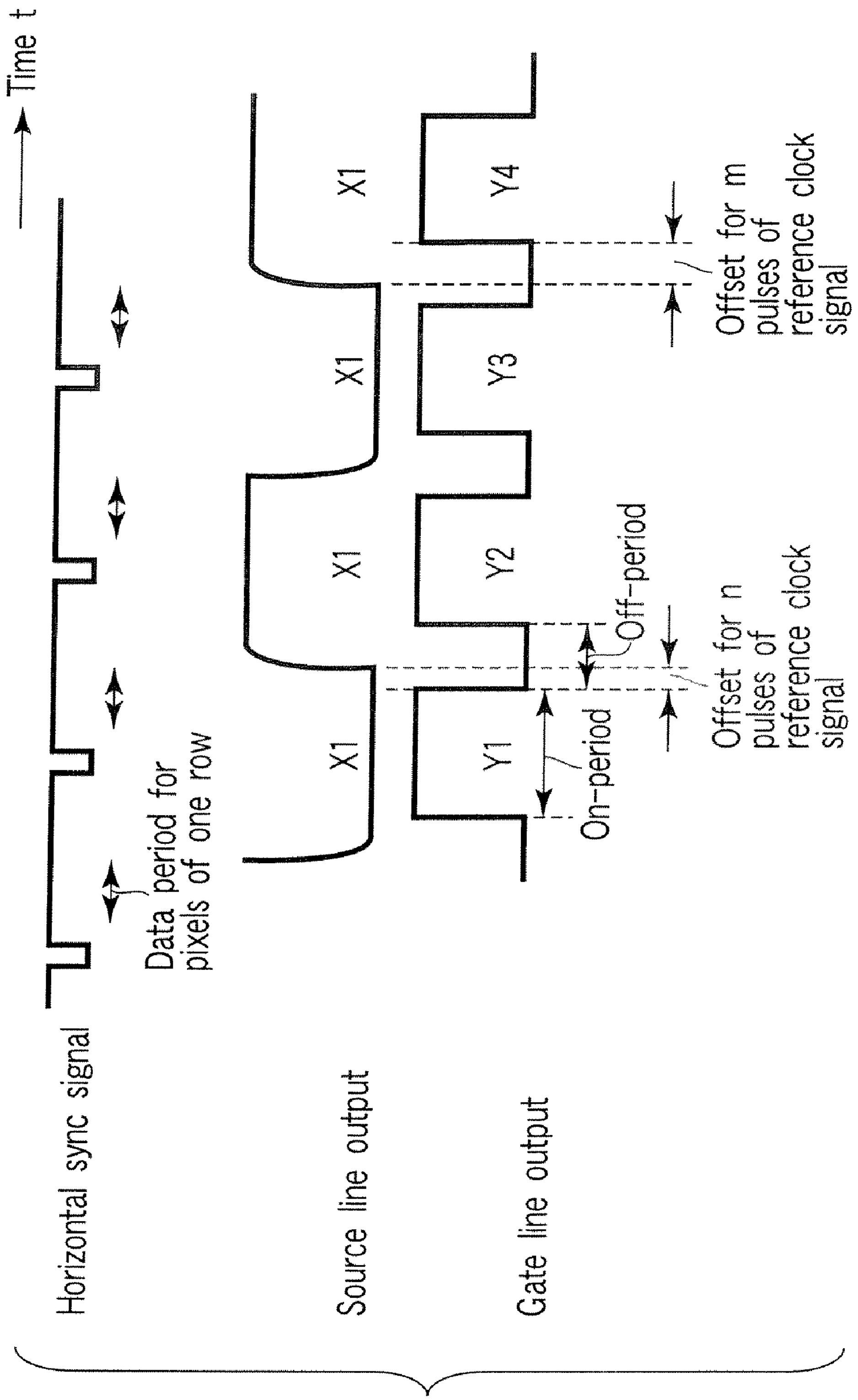
FIG. 6 shows an operation in the case where the horizontal period becomes long in the configuration shown in FIG. 2.

Further, even when one horizontal period of the sync signal is lengthened as shown in FIG. 6, the horizontal period detector 51 detects the length of the horizontal period of the sync signal as the number of pulses of the clock signal CLK2, and the drive timing generator 52 outputs the gate driver control signal CTY and source driver control signal CTX such that the row selection period is adjusted to a length obtained by excluding the numbers of pulses for the first and second offsets from the number of pulses for the horizontal period. Namely, the row selection period (on-period) is also adjusted to be sufficiently long according to the length of the horizontal period.

Also in FIG. 6, the second offset is set to n pulses of the clock signal CLK2 (reference clock signal), and the first offset is set to m pulses of the clock signal CLK2.

As described above, according to the above embodiment of the invention, the length of one horizontal period is detected as the number of pulses of the clock signal CLK2 (reference clock signal), and the row selection period (on-period) is adjusted based on the detected number of pulses. Consequently, the pixels PX of each row are driven without occurrence of insufficient charging caused by fluctuation of the horizontal period of the sync signal. Accordingly, it is possible to prevent the quality of displayed images from deteriorating due to insufficiently charged pixels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:

a liquid crystal display panel including a plurality of pixels arrayed substantially in a matrix; and a display control circuit which sequentially selects the rows of pixels in synchronism with a horizontal period of a sync signal externally supplied together with a video signal, and drives the pixels of a selected row in accordance with pixel data obtained from the video signal for each horizontal period;

wherein the display control circuit includes a clock generator which generates a reference clock signal of a constant frequency;

a period detector which detects a length of the horizontal period as the number of pulses of the reference clock signal; and a drive time adjusting section which adjusts a row selection period based on the number of pulses detected by the period detector, the drive time adjusting section holds preset time data items that represent a first offset between a timing of starting selection for the pixels of one row in synchronism with the start timing of the horizontal period and a timing of starting drive of the pixels of the selected row, and a second offset between a timing of terminating selection for the pixels of the row and a timing of terminating drive of the pixels of the selected row, by the number of pulses of the reference clock signal.

2. The liquid crystal display device according to claim 1, wherein the row selection period is set to a length obtained by excluding the numbers of the pulses for the first and second offsets from the number of pulses for the horizontal period detected by the period detector.

3. The liquid crystal display device according to claim 1, wherein the display control circuit further includes a first driver which sequentially selects the rows of pixels and a second driver which drives the pixels of a selected rows, and the drive time adjusting section includes a drive timing generator which generates first and second driver control signals such that the row selection period is adjusted to a length obtained by excluding the numbers of the pulses for the first and second offsets from the number of pulses for the horizontal period detected by the period detector.

4. A display control method of a liquid crystal display device which comprises a liquid crystal display panel including a plurality of pixels arrayed substantially in a matrix, and a display control circuit which sequentially selects the rows of pixels in synchronism with a horizontal period of a sync signal externally supplied together with a video signal, and drives the pixels of a selected row in accordance with pixel data obtained from the video signal for each horizontal period, the method comprising:

generating a reference clock signal of a constant frequency;

detecting a length of the horizontal period as the number of pulses of the reference clock signal;

adjusting a row selection period based on the detected number of pulses; and holding preset time data items that represent a first offset between a timing of starting selection for the pixels of one row in synchronism with the start timing of the horizontal period and a timing of starting drive of the pixels of the selected row, and a second offset between a timing of terminating selection for the pixels PX of the row and a timing of terminating drive of the pixels of the selected row, by the number of pulses of the reference clock signal; and adjusting the row selection period using the preset time data.

5. The display control method according to claim 4, wherein the row selection period is set to a length obtained by excluding the numbers of the pulses for the first and second offsets from the number of pulses for the detected horizontal period.

6. The display control method according to claim 4, wherein, when the display control circuit further includes a first driver which sequentially selects the rows of pixels and a second driver which drives the pixels of a selected rows. further generating control signals for the first and second drivers such that the row selection period is adjusted to a length obtained by excluding the numbers of the pulses for the first and second offsets from the number of pulses for the detected horizontal period.

* * * * *